United States Patent

Nimour et al.

(10) Patent No.: US 7,724,896 B2
(45) Date of Patent: May 25, 2010

(54) METHOD FOR TRANSMITTING MESSAGES BETWEEN AN EMITTER AND AT LEAST ON RECEIVER AND SYSTEM FOR IMPLEMENTING SAID METHOD

(75) Inventors: Abdelkrim Nimour, Chatillon (FR); Eve-Marie Barbier, Courbevoie (FR); Nicolas Bredy, Montigny-le-Betonneux (FR)

(73) Assignee: Nagra France Sarl, Paris (FR)

( * ) Notice: Subject to any disclaimer, the term of this patent is extended or adjusted under 35 U.S.C. 154(b) by 1173 days.

(21) Appl. No.: 11/297,637

(22) Filed: Dec. 9, 2005

(65) Prior Publication Data

US 2006/0140397 A1 Jun. 29, 2006

(30) Foreign Application Priority Data

Dec. 10, 2004 (EP) .................................. 04292975

(51) Int. Cl.
H04K 1/00 (2006.01)
H04L 9/28 (2006.01)

(52) U.S. Cl. ............................. 380/28; 380/211; 725/31
(58) Field of Classification Search .................. 380/264
See application file for complete search history.

(56) References Cited

U.S. PATENT DOCUMENTS 6,779,111 B1 * 8/2004 Gehrmann et al. .......... 713/171

2004/0025019 A1 * 2/2004 Watanabe et al. ........... 713/168

OTHER PUBLICATIONS

Blaze, Matt, et al., Atomic Proxy Cryptography, Nov. 1, 1997, AT&T Labs—Research, Florham Park, NJ 07932, pp. 1-11, XP-002239619.
Blaze, Matt, et al., Divertible Protocols and Atomic Proxy Cryptography, May 31, 1998, AT&T Labs—Research, Florham Park, NJ 07932, pp. 127-144, XP-000858287.
European Search Report dated May 11, 2005, for European Application No. EP 04 29 2975.

(Continued)

*Primary Examiner*—Matthew B Smithers
(74) *Attorney, Agent, or Firm*—Harness, Dickey & Pierce, P.L.C.

(57) ABSTRACT

Example embodiments relate to a method and system for transmitting messages between an emitter and at least one receiver. The method may include encrypting a message (m) to be transmitted by means of a key (a) associated to the emitter, sending the encrypted message to a conversion module including at least a conversion key ($\pi_{a\_b}$) and a conversion function, the conversion module being placed between the emitter and the at least one receiver, converting the encrypted message received in the conversion module by at least one message encrypted in such a way as to be able to be decrypted by a key (b) specific to the at least one receiver, the conversion being carried out without the initial message appearing in plaintext in the conversion module, and resulting in as much messages in accordance to a number of receivers, sending the converted message to a certain receiver, and decrypting the converted message received by the certain receiver via the key b specific to the receiver, wherein the conversion key ($\pi_{a\_b}$) of the conversion module depends on a non trivial value raised to a power of the key (a) bound to the emitter and of the key (b) bound to the at least one receiver.

9 Claims, 2 Drawing Sheets

OTHER PUBLICATIONS

Blaze et al., "Atomic Proxy Cryptography", Nov. 2, 1997, AT&T Labs Research, pp. 1-11.
Blaze et al., "Divertible Protocols and Atomic Proxy Cryptography", AT&T Labs Research, pp. 127-144.
International Search Report.
Tahler ElGamal, "A Public Key Cryptosystem and a Signature Scheme Based on Discrete Logarithms," Proceedings of.CRYPTO 84 on Advances in cryptology, 1985, pp. 10-18.

* cited by examiner

METHOD FOR TRANSMITTING MESSAGES BETWEEN AN EMITTER AND AT LEAST ON RECEIVER AND SYSTEM FOR IMPLEMENTING SAID METHOD

PRIORITY STATEMENT

This application claims the benefit of European Patent Application No. 04292975.2, filed on Dec. 10, 2004, the disclosure of which is incorporated herein in its entirety by reference.

Example embodiments relate to a method for transmitting messages between an emitter and at least one receiver, and a system including an emitter and at least one receiver.

It is placed in particular, but not exclusively, in the context of the encryption of conditional access data, this data forming a content transmitted by a supplier to several multimedia units. This data or this content can in particular be Pay-TV events.

BACKGROUND

There are currently many message encryption methods, these methods each having specific characteristics with regards to their application or their security level.

In most cases, the content is first encrypted by means of a plurality of keys which can each have a relatively short life, these keys being called "control words". The content encrypted in this way, is transmitted to multimedia units which are subscribed to the supplier. The control-words are themselves encrypted by means of a transmission key and sent in the form of control messages (Entitlement control message ECM).

The extraction and the decryption of the control words is carried out in a security module which can have notably the form of a smart card. When the control-words have been decrypted, they can be used to decrypt the content. As this method is well known to those skilled in the art, it is not described in more detail here.

There are also methods in which the use of a security module is not necessary or desired. An example of such a method uses a specific encryption type, such as notably proposed by Blaze & Strauss (Matt BLAZE, Martin STRAUSS. Atomic Proxy Cryptography, Technical report, AT&T Research, (http://www.research.att.com/resources/trs/TRs/98/98.5/98.5.1.body.ps).

This document describes an encryption method in which a message is encrypted by means of a key bound to the emitter and sent in a conversion module, which transforms the message received into another message that can be decrypted by means of a key bound to the receiver. This conversion module does neither deliver the message in plaintext, nor the key bound to the emitter, nor the one bound to the receiver. This module also contains a particular function, called thereafter conversion function, which allows the modification of the message according to the constraints defined above.

The conversion module according to Blaze & Strauss operates in the following way:

From the encryption side, that is to say the emitter side, one has a secret key "a" and a random number generator, which generates a value "k". This value belongs to the set $9^*_{2q}$ that is to say the set of integers between 0 and $2q-1$ which are prime numbers with $2q$. For example, if $q=5$, the set $9^*_{10}=\{;1;2;3;5;7;9\}$. Two values "p" and "q" are also determined such that "p" and "q" are large prime numbers and such that $p=2q+1$. The idea of a large number is not defined by a precise numerical value. The larger the used numbers are, the more difficult it is for a third party to find these values by successive attempts. The security level is therefore connected to the size of the used numbers.

The emitter also has a value "g" belonging to the set $9^*_p$.

From the encryption side, these messages are also generated $$C1 = (mg^k)_{mod\ p}$$

and $$C2 = [(g^a)^k]_{mod\ p}$$

The value $(g^a)_{mod\ p}$ is the public key of the emitter.

The couple <C1;C2> forms the message which is generated by the emitter and which is transmitted to the conversion module.

The conversion module assigns a conversion key and a conversion function.

The key is equal to:

$$\pi_{a \to b} = \left(b * \frac{1}{a}\right)_{mod\ 2q}$$

The conversion function associated to this key is:

$$C2' = [(C2)^{(\pi_{a \to b})}]_{mod\ p}$$

When the couple <C1;C2> is introduced into the conversion module, the value of C1 is not modified. C2 instead changes to C2' according to the above conversion function.

The couple <C1;C2> entering into the conversion module is transformed into an output couple <C1;C2'>. The latter is transmitted to the receiver and more precisely to the secured part of the receiver which contains the secret key b1 specific to this receiver. In principle, each receiver is provided with his own key "b".

From the received values, the receiver can deduce the message by applying the following formula:

$$m = \left(C1 * \frac{1}{(C2')^{(1/b)mod\ 2q}}\right)_{mod\ p}$$

Although perfectly functional, this method suffers a major disadvantage when it is put into practice, in particular in an environment in which an emitter supplies a great number of receivers. In fact, by knowing the key $b_1$ of a specific receiver and the conversion function $\pi_{a \to b}$, it is relatively simple to calculate the key "a" of the emitter such that $$\pi_{a \to b1} = \left(b_1 * \frac{1}{a}\right)_{mod\ 2q}.$$

From that point, it is possible for a person with bad intentions to make the key "a" of the emitter available to third parties. This then allows to calculate the keys $b_i$ of all the receivers supplied by this emitter and using the same conversion function. This means that a user who has subscribed to at least one channel managed by the data supplier can freely have access to all the other channels of this supplier.

The following description explains in more detail, the aforementioned problem.

Imagine a user having a multimedia unit STB2 with the secret key b2. This user is a subscriber of channels 1, 2 and 3 having respectively the keys a1, a2 and a3. Suppose that this user knows his secret key b2. Since he is subscriber, he receives the conversion keys $$\pi_{a1 \to b2}, \pi_{a2 \to b2} \text{ and } \pi_{a3 \to b2}, \text{ where } \pi_{ai \to b2} = \left(b_2 * \frac{1}{ai}\right)_{mod\, 2q}.$$

From these elements, it is relatively simple to calculate a1, a2 and a3. The user with bad intentions can therefore make these keys a1, a2 and a3 available, for example, by a network such as Internet.

Imagine another user having a multimedia unit STB1 with the secret key b1. This user is subscriber of channel 1 using the key a1. This channel, for example, can be a part of a cheap basic offer. The subscriber therefore receives the conversion key $$\pi_{a1 \to b1} = \left(b_1 * \frac{1}{a1}\right)_{mod\, 2q}.$$

From this point, he can easily determine b1, that is to say the secret key of his own multimedia unit. He can also receive a2 and a3 from the user having the previously mentioned multimedia unit STB2. With these elements, he can create the conversion key for channels 2 and 3 using $$\left(b_1 * \frac{1}{a2}\right)_{mod\, 2q} = \pi_{a2 \to b1} \text{ and } \left(b_1 * \frac{1}{a3}\right)_{mod\, 2q} = \pi_{a3 \to b1}.$$

In this way, he will have access to channels 2 and 3 without having acquired the corresponding subscription rights. The same is true for a person having cancelled his subscription and who has calculated the specific key b1 of his receiver before the cancellation.

In this way, if the security of one of the receivers is compromised, the security of all of the other receivers is also compromised.

Another disadvantage of the method described above is the fact that the construction of the conversion key requires the knowledge of the secret key "a" of the emitter and that of the encryption stage b, which is not optimal from a security point of view.

SUMMARY

The present invention intends to avoid the disadvantages of the methods of the prior art and in particular of the method according to Blaze & Strauss as described above.

This object is achieved by a method for transmitting messages between an emitter and at least one receiver, comprising the following steps:
encryption of the message (m) to be transmitted by means of a key (a) associated to said emitter;
sending of the encrypted message in a conversion module comprising a conversion key ($\pi_{a \to b}$) and a conversion function;
conversion of the encrypted message received in the conversion module in an encrypted message in order to be able to be decrypted by a key (b) specific to said receiver, this conversion being carried out without the initial message appearing in plaintext in the conversion module;
sending the converted message to said receiver;
decryption of said transformed message received by said receiver by means of the specific key b;
wherein the conversion key ($\pi_{a \to b}$) of the conversion module depends on a non trivial value raised to the power of the key (a) bound to the emitter and of the key (b) bound to the receiver.

The objects of the invention are also achieved by a system for transmitting messages between an emitter and at least one receiver, said emitter comprising means to encrypt said message (m) by means of a key (a) associated to this emitter, said system comprising at least one conversion module in which a conversion key ($\pi_{a \to b}$) and a conversion function are memorized, this conversion module being arranged to convert the input message (m) into a message able to be decrypted by a key (b) specific to said receiver, this receiver comprising a decryption stage arranged to decrypt the output message of the conversion module, wherein the conversion key ($\pi_{a \to b}$) of the conversion module depends on a non trivial value raised to the power of the key (a) bound to the emitter and of the key (b) bound to the receiver.

The method of the invention applies in cases where the receiver is able to decrypt encrypted messages according to the ElGamal algorithm (Taher ElGamal, "A Public-Key Cryptosystem and a Signature Scheme Based on Discrete Logarithms", IEEE Transactions on Information Theory, v. IT-31, n. 4, 1985, pp 469-472 or CRYPTO 84, pp 10-18, Springer-Verlag) or all variants of this, in particular the variants using at least one elliptic curve.

The method of the invention guarantees optimal security avoiding the necessity of using a security module. Using the method of the invention, the data stream and messages are encrypted identically for each user and can be broadcast conventionally. The data and messages are then decrypted by each user in such a way that the accessible data by one of the users cannot be used by another user.

Moreover, knowing the secret key of one of the receivers does not allow the calculation of the other keys used in the system. In this way, only the receiver whose secret key has been compromised is able to have access to data to which he does not necessarily have the authorization. He cannot let third parties take advantage. The discovery of the secrets of one of the receivers does not therefore compromise the security of other receivers connected to the same emitter.

BRIEF DESCRIPTION OF THE DRAWINGS

The invention will be better understood thanks to the following detailed description which refers to the enclosed drawings, which are given as a non limitative example, in which.

DETAILED DESCRIPTION OF EXAMPLE EMBODIMENTS

This invention is described with reference to figures, on the basis of a practical application in which the emitter is a Pay-TV management centre CG and in which the receivers are multimedia STB units intended for receiving Pay-TV events. These multimedia units are, for example, decoders or computers.

Figure 1:
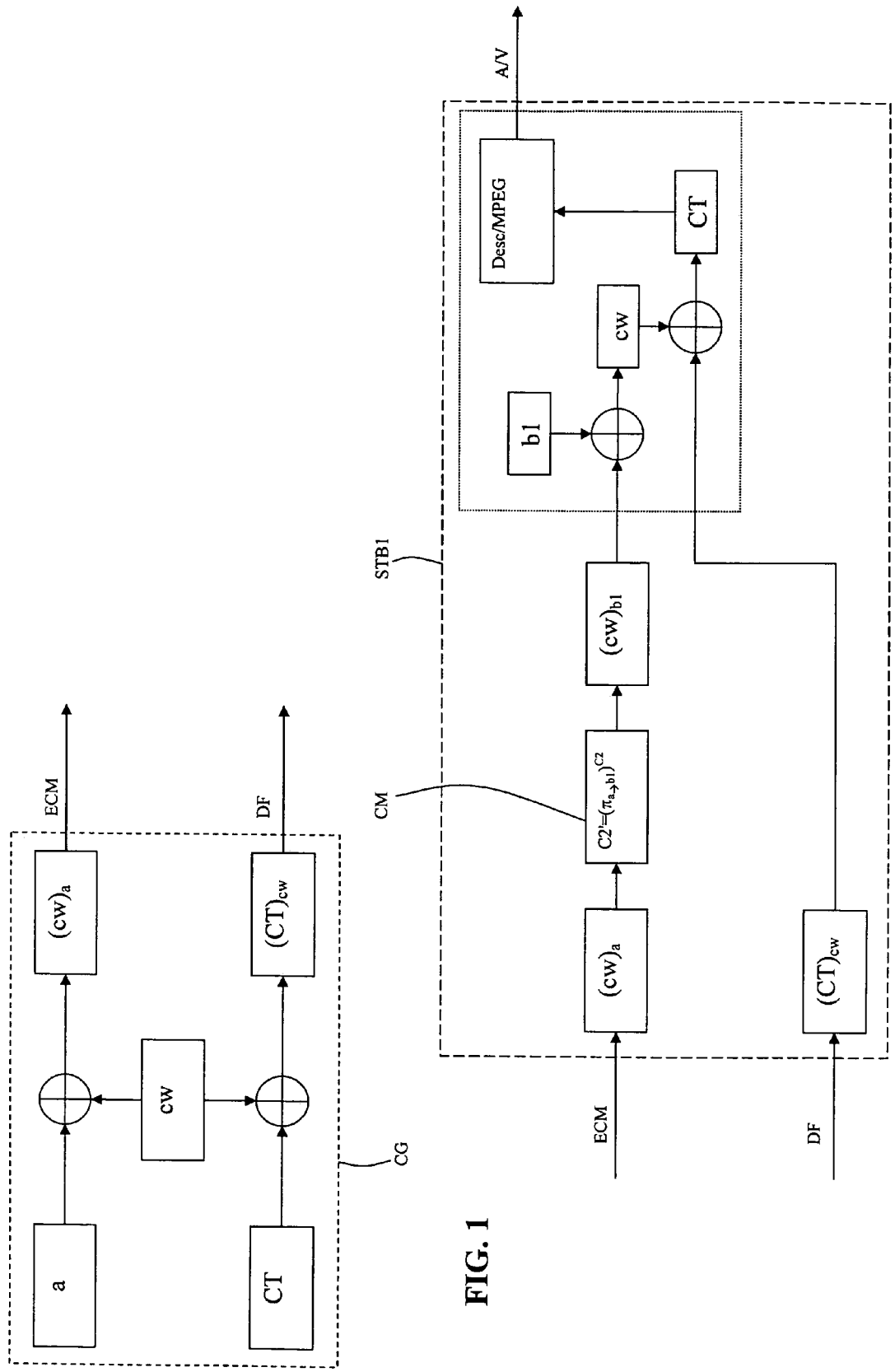
FIG. 1 represents the message transmission system according to this invention, in a specific embodiment.

In the embodiment illustrated in particular by FIG. 1, it is supposed that a content CT to be transmitted, that is to say, data relating to a Pay-TV event are encrypted by control-words cw. The method according to the invention is applied to the entitlement control messages ECM containing the control words. It is however to be noted that it is possible to directly apply the method of the invention to data relating to the pay-TV events. In this case, these would not be encrypted by control-words. In practice, however, this way of functioning is not preferred, as the time for decrypting the messages must be sufficiently short to be able to display the content adequately. Moreover, the method of the invention needs a relatively large bandwidth. The method could therefore be used when a sufficient bandwidth is provided and that the decryption can be carried out in a sufficiently rapid way.

Each multimedia unit $STB_1$, $STB_2$, $STB_n$ has a specific key, respectively $b_1$, $b_2$, $b_n$, and is associated to a conversion module CM. This module can be in a non-secured part of the decoder or physically distant from the decoder, for example in a redistribution centre such as those known under the acronym DSLAM. The management centre CG provides a key "a". It should be noted that this key "a" can be specific to a channel or a product.

When a content CT has to be transmitted, it is first encrypted by means of control-words cw. The obtained message is represented by (CT)cw in FIG. 1. The set of all the messages is sent in the form of data stream DF to the related receivers. The same controls words cw are encrypted by the key "a" of the management centre, which gives $(cw)_a$. These encrypted control words are introduced into entitlement control messages ECM in a well-known way.

The stream of the entitlement control messages ECM is also transmitted to the related receivers.

These two streams are received by a receiver represented by STB1 in FIG. 1. It is supposed here that the multimedia unit has the rights to decrypt the sent content CT, which in practice, must be verified. This verification is done conventionally, as well as the sending of the rights in the form of entitlement management messages EMM. For this reason, these steps relating to the rights are not described in detail here.

The receiver comprises a monolithic security unit containing a secret key b1, inaccessible from the exterior of this unit. It also includes an MPEG decompressor.

The stream DF of the encrypted content (CT)cw is directly transmitted to the security unit in which it will be processed. The stream of the entitlement control messages ECM is processed conventionally to extract the encrypted control-words $(cw)_a$. These control words $(cw)_a$ are then sent to the concerned conversion module of the multimedia unit. In FIG. 1, the conversion module is represented as integrated to the multimedia unit. It is also possible to group the conversion modules in a retransmission centre such as those known under the acronym DSLAM (Digital Subscriber Line Access Multiplexer). Each conversion module is then linked to the multimedia unit by a specific line.

In the conversion module, the input message, encrypted by the key "a" is converted to an output message, encrypted by the key b1. The output message $(cw)_{b1}$ is sent to the decryption stage which can decrypt it by means of the key b1.

Figure 2:
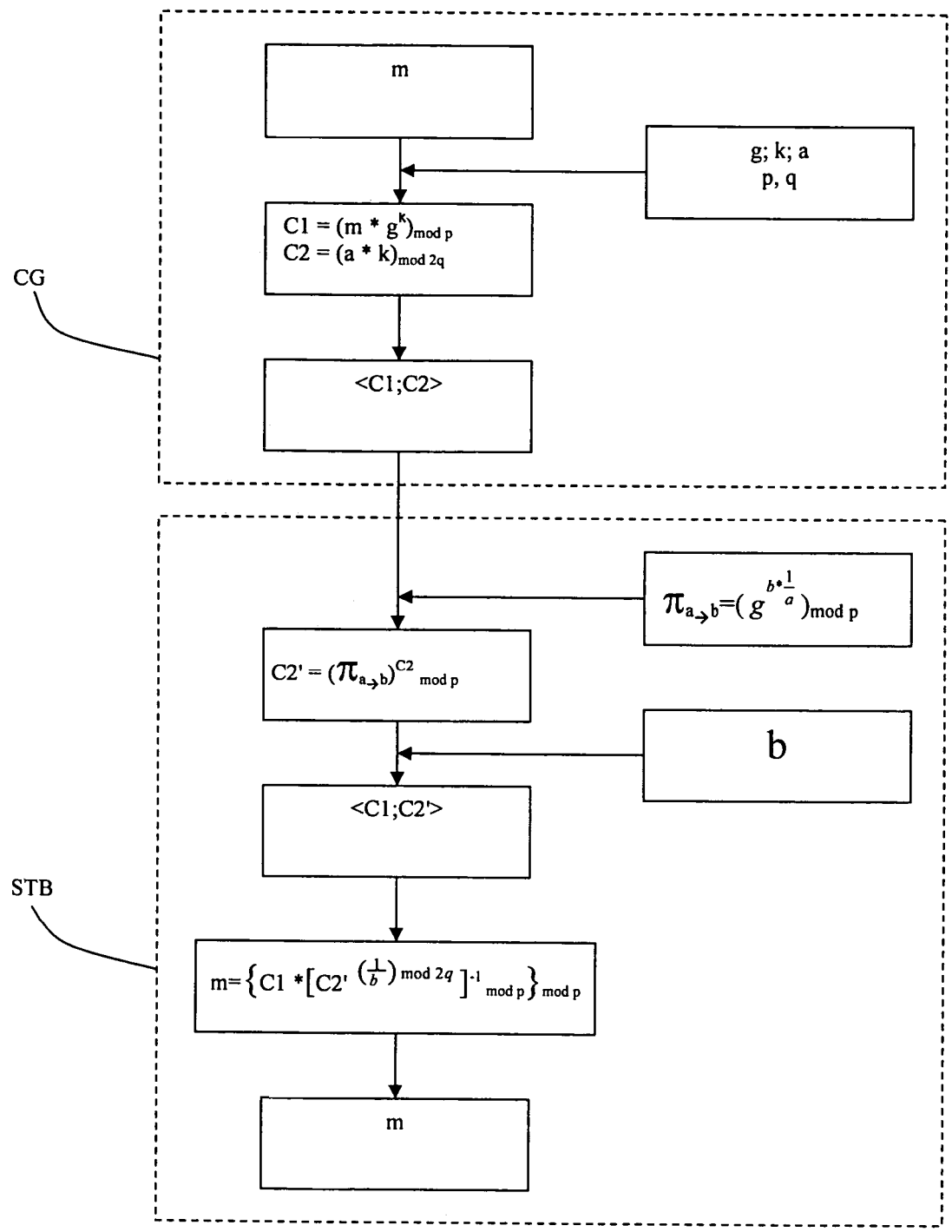
FIG. 2 shows the general message transmission method of the invention.

The conversion key as well as the associated function according to this invention are described in further detail, with reference to FIG. 2.

In reference to FIG. 1, when the control words cw have been decrypted using the key b1 of the multimedia unit, they can be used conventionally to decrypt the contents CT which, in turn, can be processed in preparation for its use, for example, on a television screen.

The following description, which refers to FIG. 2, mentions on the one hand the general method of the invention and on the other hand gives a numerical example on the basis of small values, which are not usable in practice, but which allow a better understanding of the general method. These values are too small to guarantee an adequate security level in a real application.

According to this figure, it is supposed that a message m is encrypted in the management centre and sent to the receiver STB1 having the secret key $b_1$. This initial message m leads to, in the management centre, two encrypted messages, references C1 and C2 in FIG. 2. C1 is equal to:

$$C1 = (mg^k)_{mod\, p}$$

and C2 is equal to:

$$C2 = (ak)_{mod\, 2q}$$

where p, q are large prime numbers such that p=2q+1 g is a large non trivial integer belonging to $9^*_p$, non trivial meaning different from zero or one. It should be noted that this number can be disclosed without endangering the security of the system of the invention.

"a" is the secret key of the emitter, as previously indicated and k is a random number in $9^*_{2q}$.

As a reminder, $9^*_{2q}$ is the set of integers between 0 and 2q−1 which are prime numbers with 2q.

In the numerical example, suppose that the following values have been chosen:

| p = 11 | q = 5 | k = 7 |
|---|---|---|
| g = 2 | a = 3 | m = 8 |

With these values, this gives:

$$C1 = (mg^k)_{mod\, p} = (8*2^7)_{mod\, 11} = 1$$

$$C2 = (ak)_{mod\, 2q} = (3*7)_{mod\, 10} = 1$$

The couple <C1;C2> forms the encrypted message to be sent. This couple is sent to the conversion modules of the related receivers. The following description concerns the processing of this couple in the conversion module associated to the multimedia unit STB1 having the secret key b1.

This conversion module contains the following conversion key:

$$\pi_{a \to b1} = \left( g^{(b1*\frac{1}{a}) mod\, 2q} \right)_{mod\, p}$$

It also contains the following conversion function:

$$C2' = [(\pi_{a \to b1})^{C2}]_{mod\, p}$$

The couple <C1;C2> as introduced into the conversion module is transformed into <C1;C2'> where C2' is as defined above.

It can be shown that by replacing $(\pi_{a \to b1})$ with the value indicated above and C2 with $(a*k)_{mod\, 2q}$, the converted couple <C1;C2'> is no longer dependent on the key "a" used by the management centre, but on the key b1 connected to the receiver.

Using the numerical values as defined above, and by choosing the key b1 connected to the receiver such that b1=9, this gives:

$$(\pi_{a \to b1}) = \left(g^{(b1*\frac{1}{a})mod 2q}\right)_{mod\ p}$$

By definition, $\left(\frac{1}{a}\right)_{mod\ X}$ is such that $\left(a*\frac{1}{a}\right)_{mod\ X}$ is equal to 1.

If $a = 3$, it is deduced that $1/a = 7$ since $(3*7)_{mod\ 10} = 1$

This therefore gives $(\pi_{a \to b1}) =$ $$(g^{(b1*1/a)mod 2q})_{mod\ p} = (2^{(9*7)mod 10})_{mod\ 11} = 2^3_{mod\ 11} = 8$$

$$C2' = (\pi_{a \to b1})^{C2} mod\ p = (8^1)_{mod\ 10} = 8$$

In this numerical example, the converted couple is therefore <1;8> or <C1;C2'> in general.

From this couple and by knowing the value of b1, the value of m can be calculated, that is the message which has been encrypted. This calculation is done using the following equation:

$$m = \left\{C1 * \left[C2'^{(\frac{1}{b1})mod 2q}\right]^{-1}_{mod\ p}\right\}_{mod\ p}$$

This therefore allows the decryption of the initial message. Reusing the previous numerical example, this gives:

If $b1 = 9$, $\left(\frac{1}{b1}\right)_{mod\ 2q} = \left(\frac{1}{9}\right)_{mod\ 10} = 9$ since $(9*9)_{mod\ 10} = 1$ $$m = \left\{C1 * [C2'^9]^{-1}_{mod\ p}\right\}_{mod\ p}$$

$(C2'^9)_{mod\ 11} = (8^9)_{mod\ 11} = (134217728)_{mod\ 11} = 7$ $\left(\frac{1}{7}\right)_{mod\ 11} = 8$ since $(7*8)_{mod\ 11} = 1$ $m = (1*8)_{mod\ 11} = 8$ The initial message has thus correctly been found.

Imagine that the secret key b2 of a receiver is compromised. The disclosure of the message m in plaintext does not allow another user to use it as each receiver expects to receive an encrypted message by means of the secret key of this receiver. A plaintext message cannot be used as it is not possible to avoid the first decryption stage of the module.

Using the method of the invention and supposing that a person could find the secret key b2 of his receiver, he should find the value of "a" from the equation $$\pi_{a \to b2} = \left(g^{(b2*\frac{1}{a})mod 2q}\right)_{mod\ p}$$

without knowing g. The solution to this equation passes through a logarithmic calculation. Due to the extreme difficulty in solving this type of equation, it can be ensured, by choosing numbers which are large enough, that the equation will not be solved during the validity time of these keys. With each change of key, the calculation should be re-started.

It is therefore not possible from the knowledge of the key of one multimedia unit to compromise the security of the other multimedia units.

This invention therefore allows to guarantee an optimal security level since on the one hand it is very difficult to obtain the secret key of a specific multimedia unit, and on the other hand, the discovery of one key does not endanger the whole system. This invention is therefore particularly well adapted in an environment in which one does not wish to use removable security modules such as smart cards. Moreover, the conversion module of the invention can be distant from the multimedia unit. The method therefore perfectly satisfies the requirements and constraints of conditional access television broadcast by a network such as Internet. It must however be noted that this only represents one of the possible applications of the invention.

The invention claimed is:

1. A method for transmitting messages between an emitter and at least one receiver, comprising:
   encrypting a message (m) to be transmitted by means of a key (a) associated to said emitter;
   sending the encrypted message to a conversion module including at least a conversion key ($\pi_{a \to b}$) and a conversion function, said conversion module being placed between the emitter and said at least one receiver;
   converting the encrypted message received in the conversion module by at least one message encrypted in such a way as to be able to be decrypted by a key (b) specific to said at least one receiver, the conversion being carried out without the initial message appearing in plaintext in the conversion module, and resulting in as much messages in accordance to a number of receivers;
   sending the converted message to a certain receiver; and
   decrypting said converted message received by said certain receiver via the key b specific to said receiver;
   wherein the conversion key ($\pi_{a \to b}$) of the conversion module depends on a non trivial value raised to a power of the key (a) bound to the emitter and of the key (b) bound to the at least one receiver.

2. The method according to claim 1, wherein the message (m) to be transmitted is a content (CT).

3. The method according to claim 1, wherein the message (m) to be transmitted is an authorization message containing at least one control word (cw) having served to encrypt a content (CT).

4. The method according to claim 1, wherein the key ($\pi_{a \to b}$) of the conversion module is equal to $$\pi_{a \to b} = \left(g^{(b*\frac{1}{a})mod 2q}\right)_{mod\ p}$$

where g is a non-null integer different from 1 in $K^*_p$, in the set of the integers between 0 and p−1 which are prime numbers with p;
where p and q are large prime numbers such as p=2q+1; and
where "a" is the key bound to the emitter and "b" is the key bound to the at least one receiver
and the function of the transformation module is $$C2' = [(\pi_{a \to b})^{C2}]_{mod\ p}$$

where $C2 = (a*k)_{mod\ 2q}$;
where "a" is the key bound to the emitter; and
where k is a random number in $K^*_{2q}$, in the set of integers between 0 and 2q−1 which are prime with 2q.

5. A system for transmitting messages between an emitter and at least one receiver, said emitter including means to encrypt a message (m) by means of a key (a) associated to the emitter, said system comprising:

at least one conversion module in which at least a conversion key ($\pi_{a\_b}$) and a conversion function are memorized, the at least one conversion module being placed between the emitted and said at least one receiver and further being arranged to convert the input message (m) into at least one message which is able to be decrypted by a key (b) specific to said at least one receiver, the at least one receiver including a decryption stage arranged to decrypt the output message of the at least one conversion module, wherein the conversion key ($\pi_{a\_b}$) of the at least one conversion module depends on a non trivial value raised to a power of the key (a) bound to the emitter and of the key (b) bound to the at least one receiver.

6. A system for transmitting messages according to claim 5, wherein the conversion key is $$\pi_{a \to b} = \left( g^{(b * \frac{1}{a}) \bmod 2q} \right)_{\bmod p}$$

where g is a non-null integer different from 1 in $K^*_p$, in the set of integers between 0 and p−1 which are prime number with p;

where p and q are large prime numbers such that p=2q+1; and where "a" is the key bound to the emitter and "b" is the key bound to the at least one receiver and the function of the transformation module is $$C2' = [(\pi_{a \to b})^{C2}]_{\bmod p}$$

where $C2=(a*k)_{\bmod 2q}$;

where "a" is the key bound to the emitter; and where k is a random number in $K^*_{2q}$, in the set of integers between 0 and 2q−1 which are prime numbers with 2q.

7. The system for transmitting messages according to claim 5, wherein the at least one conversion module is contained in said at least one receiver.

8. The system for transmitting messages according to claim 5, wherein the at least one conversion module is contained in a retransmission center distinct from said at least one receiver, and remotely connected to the at least one receiver.

9. A system for transmitting messages between an emitter and at least one receiver, said emitter including a device to encrypt a message (m) by a key (a) associated to the emitter, said system comprising:

at least one conversion module in which at least a conversion key ($\pi_{a\_b}$) and a conversion function are memorized, the at least one conversion module being placed between the emitted and said at least one receiver and further being arranged to convert the input message (m) into at least one message which is able to be decrypted by a key (b) specific to said at least one receiver, the at least one receiver including a decryption stage arranged to decrypt the output message of the at least one conversion module, wherein the conversion key ($\pi_{a\_b}$) of the at least one conversion module depends on a non trivial value raised to a power of the key (a) bound to the emitter and of the key (b) bound to the at least one receiver.

* * * * *

UNITED STATES PATENT AND TRADEMARK OFFICE
CERTIFICATE OF CORRECTION

PATENT NO. : 7,724,896 B2 Page 1 of 1
APPLICATION NO. : 11/297637
DATED : May 25, 2010
INVENTOR(S) : Abdelkrim Nimour et al.

It is certified that error appears in the above-identified patent and that said Letters Patent is hereby corrected as shown below:

Title page, item [54] title should read

--METHOD FOR TRANSMITTING MESSAGES BETWEEN AN EMITTER AND AT LEAST ONE RECEIVER AND SYSTEM FOR IMPLEMENTING SAID METHOD--

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,724,896 B2  Page 1 of 1
APPLICATION NO. : 11/297637
DATED : May 25, 2010
INVENTOR(S) : Abdelkrim Nimour et al.

It is certified that error appears in the above-identified patent and that said Letters Patent is hereby corrected as shown below:

Title page, item [54] and at Column 1, lines 1-4, title should read

--METHOD FOR TRANSMITTING MESSAGES BETWEEN AN EMITTER AND AT LEAST ONE RECEIVER AND SYSTEM FOR IMPLEMENTING SAID METHOD--

This certificate supersedes the Certificate of Correction issued August 17, 2010.

Signed and Sealed this

Fourteenth Day of September, 2010

David J. Kappos
*Director of the United States Patent and Trademark Office*